United States Patent [19]

Kawamura et al.

[11] Patent Number: 5,767,903
[45] Date of Patent: Jun. 16, 1998

[54] SOLID-STATE IMAGE PICKUP DEVICE OPERABLE AT A FRAME RATE WITH A CONTROLLABLE ACCUMULATING TIME INTERVAL

[75] Inventors: Toshihiro Kawamura; Yukio Taniji, both of Tokyo, Japan

[73] Assignee: NEC Corporation, Tokyo, Japan

[21] Appl. No.: 584,684

[22] Filed: Jan. 11, 1996

[30] Foreign Application Priority Data

Jan. 13, 1995 [JP] Japan ................... 7-020950

[51] Int. Cl.⁶ ............................................ H04N 5/335
[52] U.S. Cl. ..................... 348/296; 348/297; 386/130
[58] Field of Search .................. 348/207, 294, 348/295, 296, 297, 298, 311, 312, 314, 910; 386/128, 130, 129

[56] References Cited

U.S. PATENT DOCUMENTS 4,736,250  4/1988  Blazo ........................ 386/130

5,488,416  1/1996  Kyuma ...................... 348/296

FOREIGN PATENT DOCUMENTS 2278980  11/1990  Japan .

*Primary Examiner*—Andrew Faile
*Assistant Examiner*—Tuan V. Ho
*Attorney, Agent, or Firm*—Whitman, Curtis & Whitham

[57] ABSTRACT

In a solid-state image pickup device comprises a solid-state image pickup section (10) including a substrate and a plurality of photoelectric converting sections formed on the substrate, the photoelectric converting sections accumulates, in response to incident light, electric charges during a controllable accumulating time interval in each frame period as signal charges in synchronism with a frame rate. Connected to the substrate, electronic shutter means discards disused charges during a discarding time interval in the frame period from the photoelectric converting sections to the substrate. The discarding time interval is equal to a difference between the frame period and the controllable accumulating time interval. Connected to the solid-state image pickup section, a timing pulse generating section (20) controls the controllable accumulating time interval.

16 Claims, 10 Drawing Sheets

SOLID-STATE IMAGE PICKUP DEVICE OPERABLE AT A FRAME RATE WITH A CONTROLLABLE ACCUMULATING TIME INTERVAL

BACKGROUND OF THE INVENTION

This invention relates to a solid-state image pickup device for use in picking up image and, more particularly, to a solid-state image pickup device comprising a solid-state image pickup section with an electronic shutter for discarding unused charges from photoelectric converting sections to a substrate.

In general, a solid-state image pickup device comprises a solid-state image pickup section, a timing pulse generating section, a sample-hold circuit, and a signal processing circuit. The solid-state image pickup section includes a substrate and a plurality of photoelectric converting sections. The photoelectric converting sections are formed on the substrate and are arranged in the configuration of a matrix with m rows and n columns where m and n represent first and second positive integers each of which is not less than two. The photoelectric converting sections accumulate, in response to incident light, electric charges in each field period as signal charges in synchronism with a field rate of, for example, 60 Hz. The solid-state image pickup section further includes n vertical transfer registers, a horizontal shift register, and an output amplifier. The n vertical transfer registers are formed on the substrate and are adjacent to the n columns of the photoelectric converting sections of one side thereof. Each of the n vertical transfer registers extends along a vertical direction. The n vertical transfer registers read the signal charges out of the photoelectric converting sections as read charges to transfer the read charges along the vertical direction as vertical transferred charges. The horizontal shift register is formed on the substrate and is connected to an end of each vertical transfer register. The horizontal shift register extends along a horizontal direction. The horizontal shift register serially shifts the vertical transferred charges as horizontal shifted charges. The output amplifier is connected to an end of the horizontal shift register. The output amplifier converts the horizontal shifted charges into a picked-up voltage signal. At any rate, the conventional solid-state image pickup section is operable in synchronism with the field rate.

The timing pulse generating section is connected to the solid-state image pickup section. The timing pulse generating section supplies driving pulses to the n vertical transfer registers and the horizontal shift register to make the solid-state image pickup section produce the picked-up voltage signal. The sample-hold circuit is connected to the output amplifier. The sample-hold circuit samples and holds the picked-up voltage signal to produce a sampled-and-held signal. The signal processing circuit is connected to the sample-hold circuit. The signal processing circuit carries out a processing on the sampled-and-held signal into a processed signal as an output video signal. The output video signal is supplied to a television monitor to display image represented by the output video singal on a screen thereof. The television monitor has a field rate equal to that of the solid-state pickup device and is herein called a television rate.

It will be assumed that the conventional solidstate pickup device picks up image on a screen of a display device in, for example, a personal computer to display the output video signal on the television monitor. In this event, horizontal streaks occur in the image on the screen of the television monitor. This is because the display device has a vertical scanning rate or a display's scanning frequency which is different from the field rate of the solid-state image pickup device. More specifically, white horizontal streaks occur in the image on the screen of the television monitor when the display device has the vertical scanning rate higher than the field rate (the television rate). On the other hand, black horizontal streaks occur in the image on the screen of the television monitor when the display device has the vertical scanning rate lower than the field rate (the television rate). In addition, a phenomenon where the horizontal streaks flows along the vertical direction on the screen of the television monitor occurs. This is because the display device is operable in asynchronism with the field rate of the solid-state image pickup device (the television rate of the television monitor). Such a phenomenon is known as line crawl in the art.

In order to cancel the above-mentioned line crawl, a method have been already proposed in Japanese Unexamined Patent Prepublication of Kôkai No. Hei 2-278,980, namely, 278,980/1990 having the title of invention "PSEUDO FRAME ELECTRONIC SHUTTER AND LUMINANCE SIGNAL FORMING METHOD". A solid-state image pickup device according to Kôkai No. Hei 2-278,980 comprises, as the solid-state image pickup section, a frame interline transfer (FIT) type solid-state image pickup section including a photosensitive region on which a mosaic filter is mounted. The solid-state image pickup device further comprises a frame memory. Read out of the FIT type solid-state image pickup section, a picked-up voltage signal is stored in the frame memory as frame image data consisting of a plurality of image data elements. The image data elements adjacent to each other are multiplied by weight coefficients to produce multiplied results which are added to each other and it results in reducing occurrence of the line crawl.

In order to cancel the above-mentioned line crawl, another method uses a system called a clear scan system. The clear scan system comprises, as the solid-state image pickup section, an interline transfer (IT) type solid-state image pickup section provided with a variable speed electronic shutter. The clear scan system realizes synchronization for the vertical scanning rate of the display device by reading in synchronism with the field rate and using the variable speed electronic shutter.

However, each of the above-mentioned methods cannot be applied to a case of picking up image on the screen of the display device having the vertical scanning rate lower than the television rate while each of the above-mentioned methods can be applied to another case of picking up image on the screen of the display device having the vertical scanning rate higher than the television rate. This is because the solid-state image pickup device has the longest accumulating time interval for electric charges that is shorter than a time required for one field scanning of the screen in the display device. As a result, black horizontal streaks are displayed on the screen of the television monitor because several scanning lines in the screen of the display device cannot be picked up during each field period by the solid-state image pickup device.

In addition, each of the conventional methods is disadvantageous in that it results in degradation of resolution in the vertical direction because readout of image is carried out in synchronism with the field rate.

SUMMARY OF THE INVENTION

It is therefore an object of this invention to provide a solid-state image pickup device which is capable of preventing generation of a spurious signal due to beat components of a black band generated in case of picking up image on a screen of a display device having a vertical scanning rate lower than a television rate.

It is another object of this invention to provide a solid-state image pickup device of the type described, which is capable of avoiding degradation of resolution in a vertical direction.

Other objects of this invention will become clear as the description proceeds.

According to an aspect of this invention, a solid-state image pickup device comprises a solid-state image pickup section which includes a substrate and a plurality of photoelectric converting sections formed on the substrate and arranged in the configuration of a matrix with m rows and n columns where m and n represent first and second positive integers each of which is not less than two. Responsive to incident light, the photoelectric converting sections accumulates electric charges during a controllable accumulating time interval in each frame period as signal charges in synchronism with a frame rate. Connected to the substrate, electronic shutter means discards disused charges during a discarding time interval in the frame period from the photoelectric converting sections to the substrate. The discarding time interval is equal to a difference between the frame period and the controllable accumulating time interval. Connected to the solid-state image pickup section, control means controls the controllable accumulating time interval.

According to another aspect of this invention, a method is of picking up image on a screen of a display device by a solid-state image pickup device. The solid-state image pickup device comprises a solid-state image pickup section including a plurality of photoelectric converting sections for accumulating, in response to incident light, electric charges during a controllable accumulating time interval in each frame period as signal charges in synchronism with a frame rate and electronic shutter means for discarding disused charges during a discarding time interval in the frame period from the photoelectric converting sections. The discarding time interval is equal to a difference between the frame period and the controllable accumulating time interval. The display device has a vertical scanning rate higher than the frame rate. The method comprises the step of controlling the controllable accumulating time interval so that the controllable accumulating time interval is equal to a vertical scanning period which is the reciprocal of the vertical scanning rate.

DESCRIPTION OF THE PREFERRED EMBODIMENT

Figure 1:
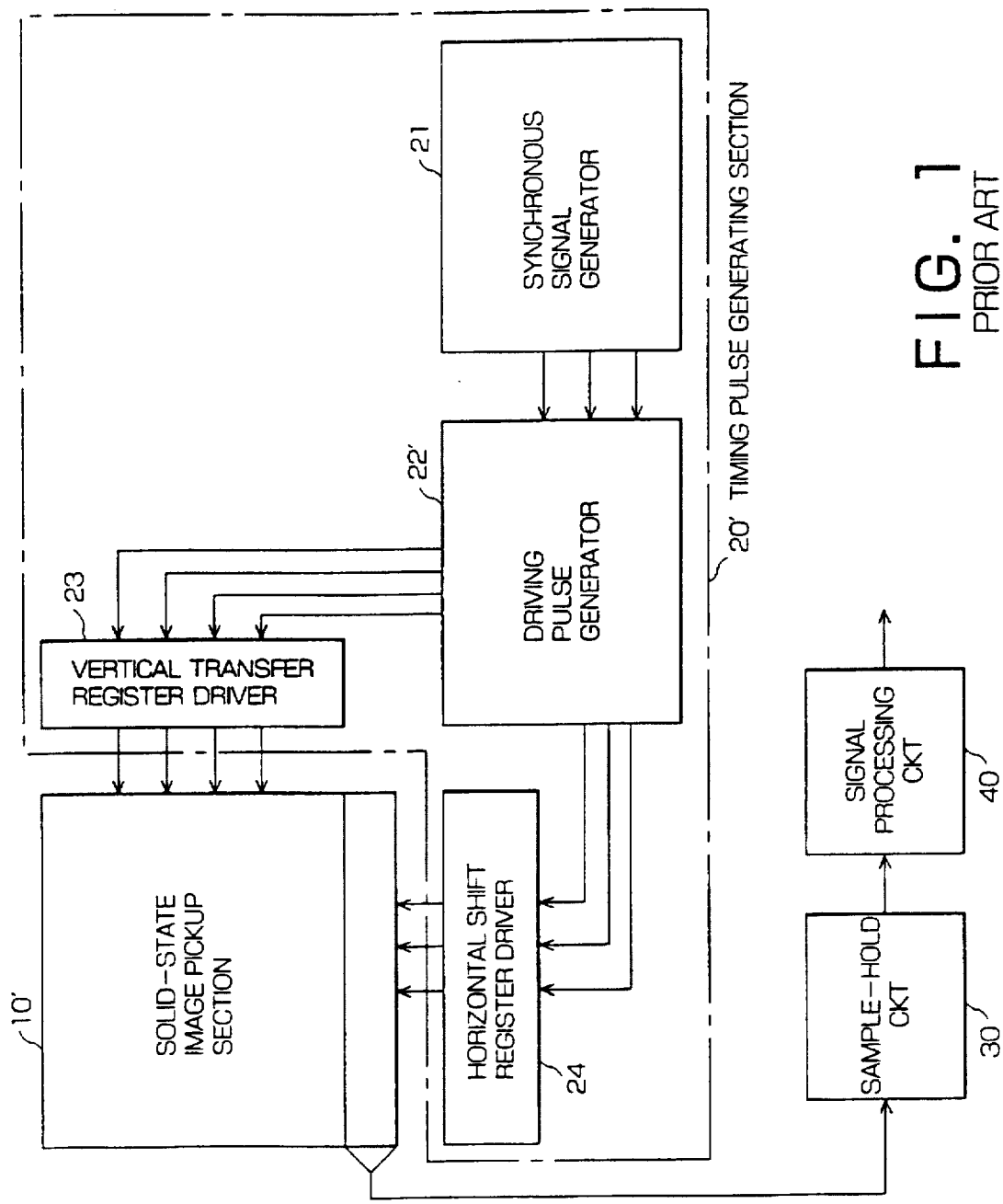
FIG. 1 is a block diagram of a conventional solid-state image pickup device.
Figure 2:
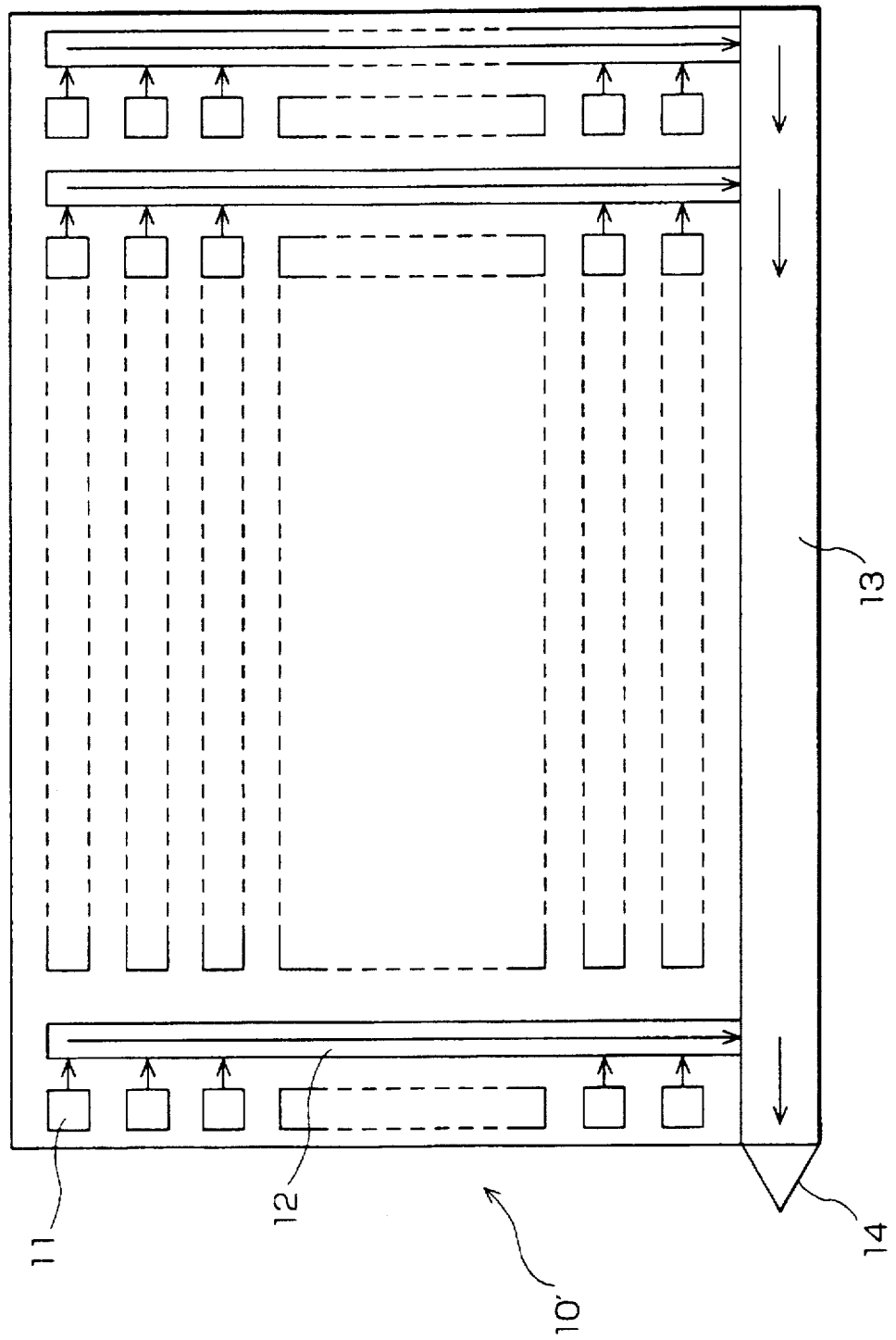
FIG. 2 is a schematic plan view of a solid-state image pickup section for use in the solid-state image pickup device illustrated in FIG. 1.

Referring to FIGS. 1 and 2, a conventional solid-state image pickup device will be described at first in order to facilitate an understanding of the present invention. The illustrated solid-state image pickup device is called a CCD solid-state image pickup device of interline transfer (IT) type or all pixels readout type.

In FIG. 1, the device comprises a solid-state image pickup section 10', a timing pulse generating section 20', a sample-hold circuit 30, and a signal processing circuit 40. The timing pulse generating section 20' supplies driving pulses to the solid-state image pickup section 10' to make the solid-state image pickup section 10' produce a picked-up voltage signal. The picked-up voltage signal is supplied to the sample-hold circuit 30. The sample-hold circuit 30 samples and holds the picked-up voltage signal to produce a sampled-and-held signal. The sampled-and-held signal is supplied to the signal processing circuit 40. The signal processing circuit 40 processes the sampled-and-held signal into a processed singal as an output video signal. The output video signal is supplied to a television monitor (not shown) to display image represented by the output video signal on a screen thereof. The television monitor has a field rate equal to that of the solid-state pickup device and is called a television rate. When the television monitor is of the National Televison System Committee (NTSC) system, the television rate is equal to 60 Hz.

Turning to FIG. 2, the solid-state image pickup section 10' includes a substrate (not shown) and a plurality of photoelectric converting sections 11 such as photodiodes. The photoelectric converting sections 11 formed on the substrate and are arranged in the configuration of a matrix with m rows and n columns, where m and n represent first and second positive integers each of which is not less than two. The m rows of the photoelectric converting sections 11 are disposed with a horizontal space left between the adjacent photoelectric converting sections 11 in a vertical direction. Likewise, the n columns of the photoelectric converting sections 11 are disposed with a vertical space left between the adjacent photoelectric converting sections 11 in a horizontal direction. The photoelectric converting sections 11 accumulate, in response to incident light, electric charges in each field period as signal charges in synchronism with a field rate which is, for example, equal to 60 Hz in the NTSC system. The photoelectric converting sections 11 correspond to picture elements or pixels, respectively.

The solid-state image pickup section 10' further comprises n vertical transfer registers 12, a horizontal shift register 13, and an output amplifier 14. The n vertical transfer registers 12 are formed on the substrate and are adjacent to the n columns of the photoelectric converting sections 11 at one sides thereof. Each of the n vertical transfer registers 12 extends along the vertical direction and is arranged in the vertical space between the photoelectric converting sections 11. The n vertical transfer registers 12 read the signal charges out of the photoelectric converting sections 11 in the respective n columns as read charges to transfer the read charges along the vertical direction as vertical transferred charges. The horizontal shift register 13 is formed on the substrate and is connected to one ends of the n vertical transfer registers 12. The horizontal shift register 13 extends along the horizontal direction. The horizontal shift register 13 receives the vertical transferred charges from the n vertical transfer registers 12 horizontal line by horizontal line as received charges to serially shift the received charges along the horizontal direction as horizontal shifted charges. The output amplifier 14 is connected to an end of the horizontal shift register 13. The output amplifier 14 receives the horizontal shifted charges to convert the horizontal shifted charges into the picked-up voltage signal. At any rate, the solid-state image pickup section 10' is operable at the field rate in a progressive scanning fashion.

Turning back to FIG. 1, the timing pulse generating section 20' is connected to the solid-state image pickup section 10'. The timing pulse generating section 20' supplies the driving pulses the n vertical transfer registers 12 (FIG. 2) and the horizontal shift register 13 (FIG. 2) to make the solid-state image pickup section 10' produce the picked-up voltage signal. More specifically, the timing pulse generating section 20' comprises a synchronous signal generator 21, a driving pulse generator 22', a vertical transfer register driver 23, and a horizontal shift register driver 24. The synchronous signal generator 21 generates synchronous signals which are supplied to the driving pulse generator 22'. Responsive to the synchronous signals, the driving pulse generator 22' generates vertical driving pulses and horizontal driving pulses which are supplied to the vertical transfer register driver 23 and the horizontal shift register driver 24, respectively. The vertical transfer register driver 23 supplies the vertical driving pulses to the n vertical transfer registers 12 to drive the n vertical transfer registers 12. The horizontal shift register driver 24 supplies the horizontal driving pulses to the horizontal shift register 13 to drive the horizontal shift register 13. At any rate, the timing pulse generating section 20' makes the solid-state image pickup section 10' operate in synchronism with the field rate.

Figure 3:
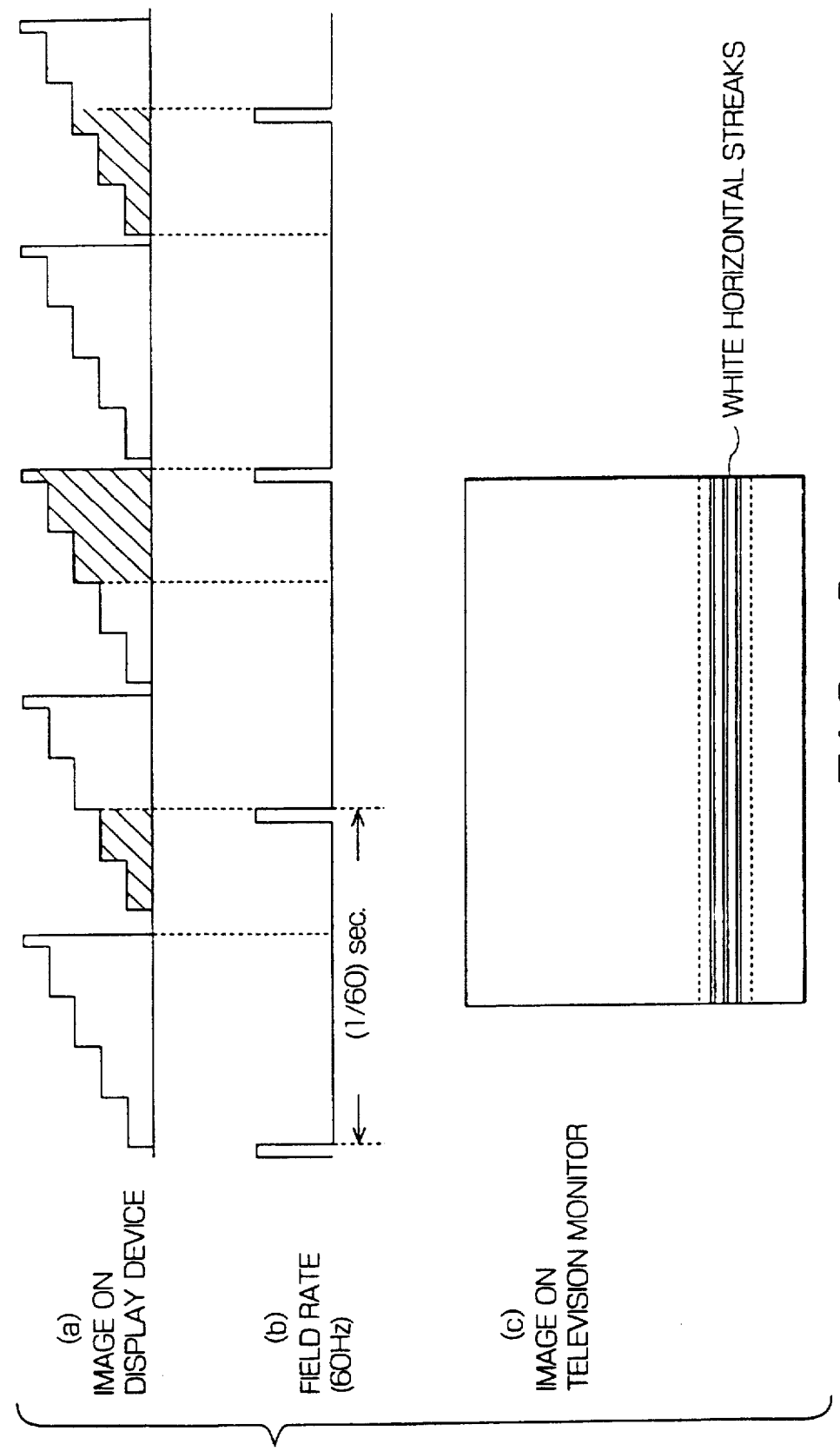
FIGS. 3(a)-(c) collectively show a time chart for use in an operation in the solid-state image pickup device illustrated in FIG. 1 in a case where a display device has a vertical scanning rate higher than a television rate.
Figure 4:
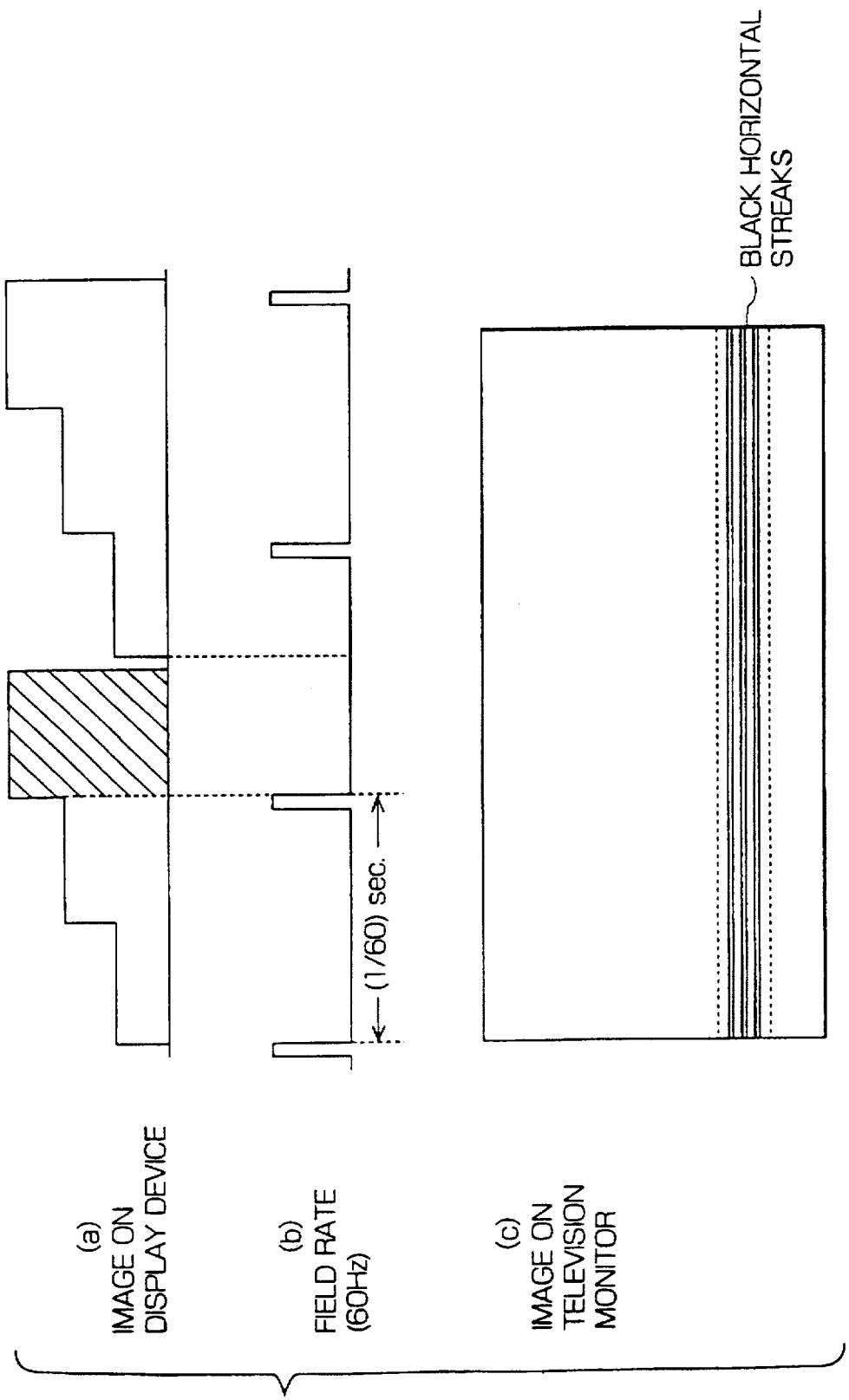
FIGS. 4(a)-(c) collectively show another time chart for use in another operation in the solid-state image pickup device illustrated in FIG. 1 in another case where a display device has a vertical scanning rate lower than a television rate.

Referring to FIGS. 3(a)–(c) and 4(a)–(c), description will proceed to operation in the conventional solid-state image pickup device on picking up image on a screen of a display device, for example, in a personal computer to display the output video signal on the screen of the television monitor. FIGS. 3(a)–(c) illustrate an operation in a case where the display device has a vertical scanning rate higher than the field rate (the television rate) while FIGS. 4(a)–(c) illustrate another operation in another case where the display device has a vertical scanning rate lower than the field rate (the television rate). In each of FIGS. 3 and 4, (a) shows the image on the screen of the display device, (b) shows timings of the field rate, and (c) the image on the screen of the television monitor.

As shown in FIGS. 3(a) and (b), it will be assumed that the display device has the vertical scanning rate higher than the field rate. In this event, white horizontal streaks occur in the image on the screen of the television monitor as illustrated in FIG. 3(c). This is because the solid-state image pickup device has an accumulating time interval in each field rate which is longer than a vertical scanning period of the display device and it results in picking up the image on the screen of the display device with a portion of slanting lines in FIG. 3(a) overlapped. In addition, a phenomenon, which is known as line crawl in the art, where a band of the white horizontal streaks flows along the vertical direction on the screen of the television monitor occurs. This is because the display device is operable in asynchronism with the field rate of the solidstate image pickup device.

As shown in FIGS. 4(a) and (b), it will be assumed that the display device has the vertical scanning rate lower than the field rate. In this event, black horizontal streaks occur in the image on the screen of the television monitor as illustrated in FIG. 4(c). This is because the solid-state image pickup device has the accumulating time interval in each field rate which is shorter than a vertical scanning period of the display device and it results in picking up the image on the screen of the display device with a portion of slanting lines in FIG. 4(a) insufficient. In addition, the line crawl also occurs because the display device is operable in asynchronism with the field rate of the solid-state image pickup device.

Figure 5:
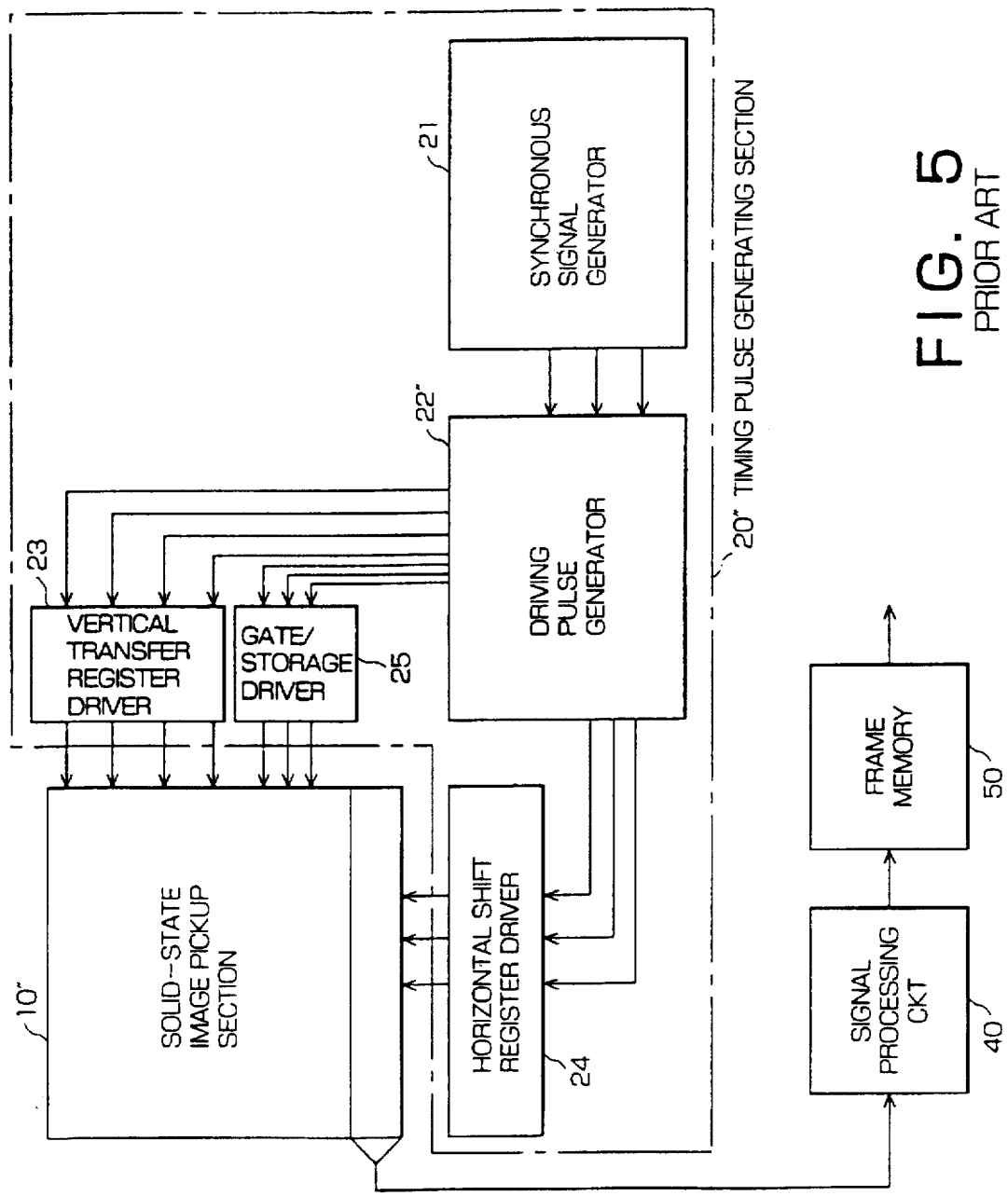
FIG. 5 is a block diagram of another conventional solid-state image pickup device.
Figure 6:
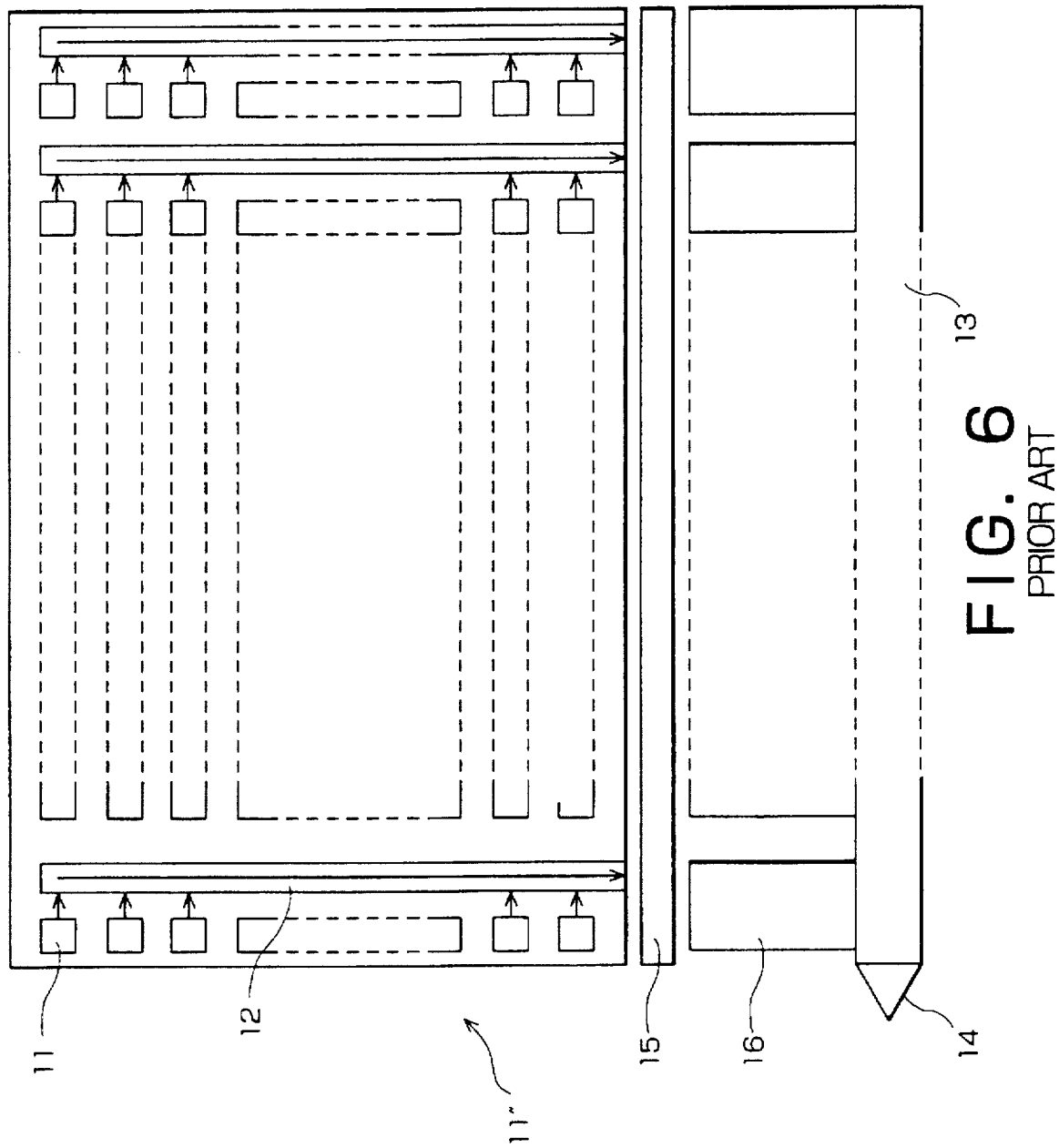
FIG. 6 is a schematic plan view of a solid-state image pickup section for use in the solid-state image pickup device illustrated in FIG. 5.

Referring to FIGS. 5 and 6, another conventional solid-state image pickup device will be described in order to facilitate an understanding of the present invention. The illustrated solid-state image pickup device is called a CCD solid-state image pickup device of frame interline transfer (FIT) type. Such a solid-state image pickup device is, for example, disclosed in the above-mentioned Kôkai No. Hei 2-278,980.

In FIG. 5, the device comprises a solid-state image pickup section 10", a timing pulse generating section 20", the signal processing circuit 40, and a frame memory 50. The timing pulse generating section 20" supplies driving pulses to the solid-state image pickup section 10" to make the solid-state image pickup section 10" produce a picked-up voltage signal. The picked-up voltage signal is supplied to the signal processing circuit 40. The signal processing circuit 40 processes the picked-up voltage signal into a digital processed signal. The digital processed signal is stored in the frame memory 50 as frame image data which consists of a plurality of image data elements. The image data elements adjacent to each other are multiplied by weight coefficients to produce multiplied results which are added to each other. As a result, it is possible to reduce occurrence of the line crawl in a case of picking up image on the screen of the display device having the vertical scanning rate higher than the television rate.

Turning to FIG. 6, the solid-state image pickup section 10" comprises a transfer gate 15 and a storage section 16 as well as the photoelectric converting sections 11, the n vertical transfer registers 12, the horizontal shift register 13, and the output amplifier 14. A combination of the photoelectric converting sections 11 and the n vertical transfer registers 12 serves as a photosensitive region on which a mosaic filter (not shown) is mounted. The transfer gate 15 and the storage section 16 are inserted between the photosensitive region and the horizontal shift register 13. With this structure, the vertical transferred charges are temporarily held in the storage section 16 via the transfer gate 15 as stored charges and thereafter the stored charges are serially shifted by the horizontal shift register 13 as the horizontal shifted charges.

Turning back to FIG. 5, the timing pulse generating section 20" comprises a gate/storage driver 25 as well as the synchronous signal generator 21, a driving pulse generator 22", the vertical transfer register driver 23, and the horizontal shift register driver 24. Responsive to the synchronous signals from the synchronous signal generator 21, the driving pulse generator 22" generates the vertical driving pulses, the horizontal driving pulses, and gate/storage driving pulses which are supplied to the vertical transfer register driver 23, the horizontal shift register driver 24, and the gate/storage driver 25, respectively. The gate/storage driver 25 supplies the gate/storage driving pulses to the transfer gate 15 and the storage section 16 to drive the transfer gate 15 and the storage section 16. At any rate, the timing pulse generating section 20" makes the solid-state image pickup section 10" operate in synchronism with the field rate in an interlaced scanning fashion.

However, the conventional solid-state image pickup device illustrated in FIGS. 5 and 6 cannot be applied to a case of picking up image on the screen of the display device having the vertical scanning rate lower than the television rate. This is because the solid-state image pickup device has the accumulating time interval for electric charges in each field period that is shorter than a time required for one field scanning of the screen in the display device. As a result, black horizontal streaks as illustrated in FIG. 4(c) are displayed on the screen of the television monitor because several scanning lines in the screen of the display device cannot be picked up during each field period by the solid-state image pickup device. In addition, the conventional solid-state image pickup device illustrated in FIGS. 5 and 6 is disadvantageous in that it results in degradation of resolution in the vertical direction because readout of image is carried out in synchronism with the field rate in the interlaced scanning fashion.

Figure 7:
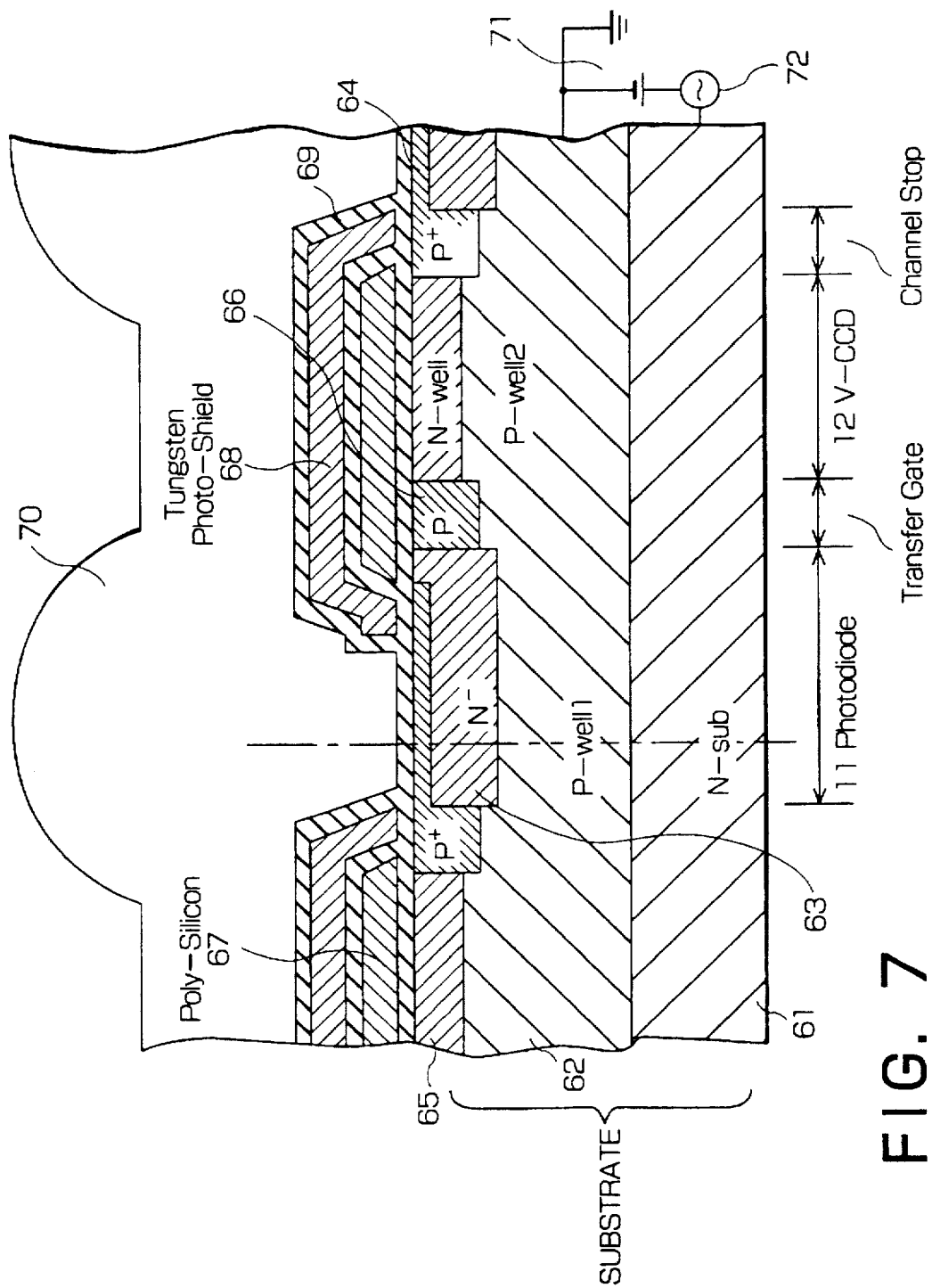
FIG. 7 is a cross-sectional view in a solid-state image pickup section for use in a clear scan system.
Figure 8:
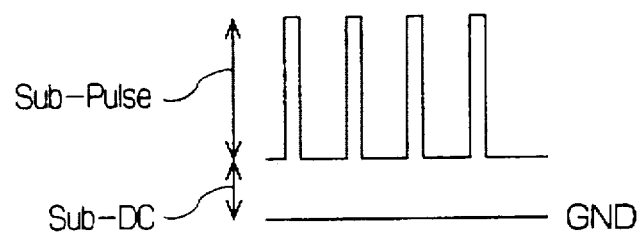
FIG. 8 shows a waveform of a signal produced by a variable speed electric shutter for use in the solidstate image pickup section illustrated in FIG. 7.
Figure 9:
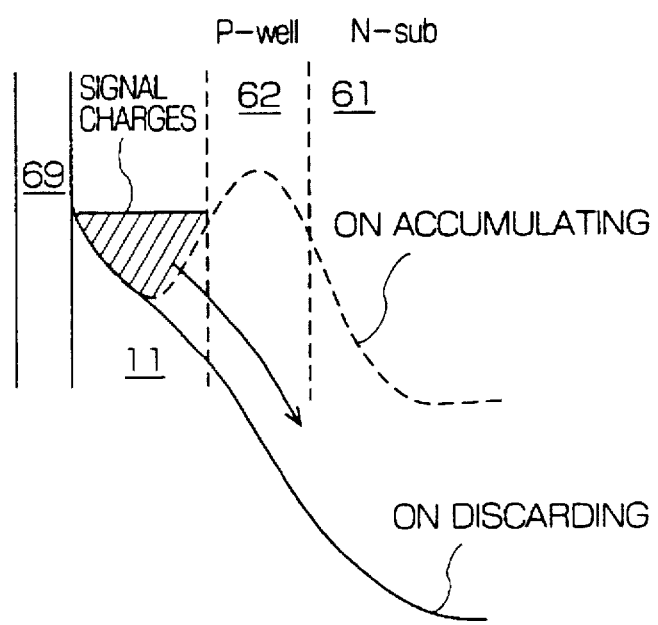
FIG. 9 shows electric potentials in cross-section of line H-H' in FIG. 7 on accumulating of signal charges and on discarding of the signal charges.

Referring to FIGS. 7 through 9, the description will proceed to a known clear scan system which can cancel the line crawl when the display device has the vertical scanning rate higher than the television rate. The clear scan system comprises, as the solid-state image pickup section, an interline transfer (IT) type solid-state image pickup section provided with a variable speed electronic shutter.

As shown in FIG. 7, the IT type solid-state image pickup section comprises an N-type semiconductor substrate 61. The N-type semiconductor substrate 61 is prepared in a known manner and has the principal surface which is directed upwards of FIG. 7. On the principal surface of the N-type semiconductor substrate 61, a P-type well layer 62 is formed. The P-type well layer 62 is divided into first and second P-type well sections labelled "P-well1" and "P-well2" in FIG. 7, respectively. A combination of the N-type semiconductor substrate 61 and the P-type well layer 62 serves as a substrate. The P-type well layer 62 has a surface area in which m by n N⁻-type semiconductor regions 63, m by n P⁺-type semiconductor regions 64, n N-type well semiconductor regions 65, and a plurality of P-type semiconductor regions 66 are formed. The m by n N⁻-type semiconductor regions 63 and the m by n P⁺-type semiconductor regions 64 collectively acts as the m by n photoelectric converting sections or photodiodes 11 as shown in FIG. 1. The n N-type well semiconductor regions 65 serve as the n vertical transfer registers 12 as shown in FIG. 1. The P-type semiconductor regions 66 acts as transfer gates inserted between the photodiodes 11 and the vertical transfer registers 12. The P⁺-type semiconductor regions 64 are operable as channel stops inserted between the photodiodes 11 and the vertical transfer registers 12. On the surface area of the P-type well layer 62, a plurality of poly-silicon regions 67 and n tungsten photo-shields 68 are formed through an insulation film 69. The poly-silicon regions 67 act as vertical transfer electrodes. On the surface area of the P-type well layer 62, m by n lens portions 70 are also formed through the insulation film 69.

Referring to FIG. 8 in addition to FIG. 7, the P-type well layer 62 is grounded. Between the N-type semiconductor substrate 61 and the P-type well layer 62, a sub-DC voltage power supply 71 and a sub-pulse generator 72 are connected in series. As a result, a train of sub-pulses are supplied from the P-type well layer 62 to the N-type semiconductor substrate 61 with a sub-DC voltage overlapped as illustrated in FIG. 8. A combination of the sub-DC voltage power supply 71 and the sub-pulse generator 72 serves as the above-mentioned variable speed electronic shutter.

Turning to FIG. 9, description will proceed to operation on accumulating of the signal charges and on discarding of the signal charges using the variable speed electronic shutter in the known Clear Scan system. FIG. 9 shows electric potentials in cross-section of line H–H' in FIG. 7. In FIG. 9, a dashed line indicates an electric potential on accumulating of the signal charges while a solid line indicates another electric potential on discarding of the signal charges using the variable speed electronic shutter. When any sub-pulse is absent during an accumulating time interval, the signal charges are accumulated in the photoelectric converting sections or the photodiodes 11 as illustrated with a portion of slanting lines in FIG. 9. When each sub-pulse is present in during a discarding time interval, the signal charges are discarded to the N-type semiconductor substrate 61 through the P-type well layer 62 as illustrated at an arrow in FIG. 9.

The clear scan system, however, cannot be applied to a case of picking up image on the screen of the display device having the vertical scanning rate lower than the television rate, as similar manner in the conventional solid-state image pickup device illustrated in FIG. 5. This is because the clear scan system also has the longest accumulating time interval of (1/60) sec. for the signal charges that is shorter than the time required one field of the display device. As a result, black horizontal streaks are displayed on the screen of the television monitor. In addition, the clear scan system is also disadvantageous in that it results in degradation of resolution in the vertical direction. This is because the clear scan system is also operable in synchronism with the field rate of, for example, 60 Hz in the interlaced scanning fashion, as similar manner in the conventional solid-state image pickup device illustrated in FIG. 5.

Figure 10:
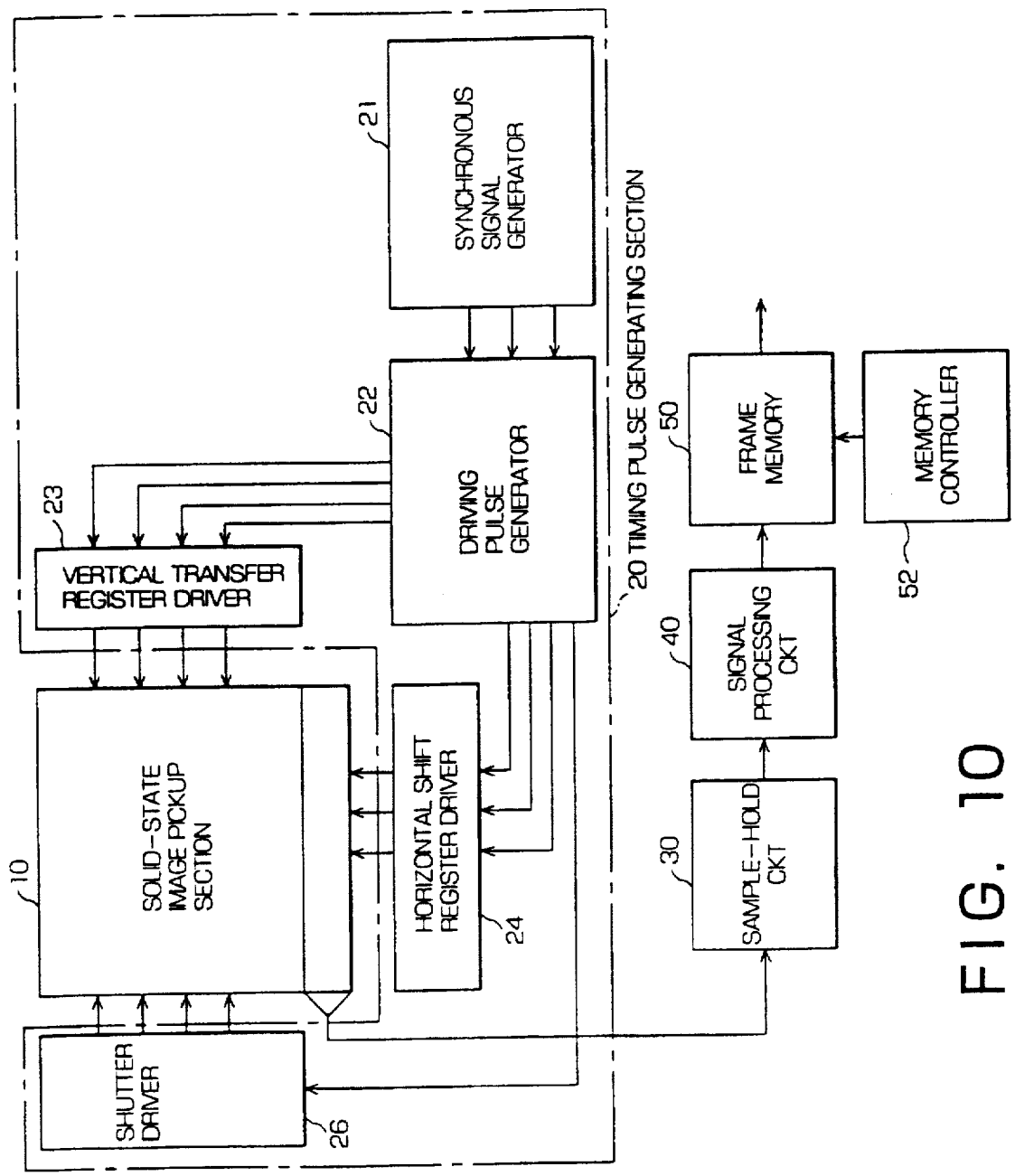
FIG. 10 is a block diagram of a solid-state image pickup device according to a preferred embodiment of this invention.

Referring to FIG. 10, description will proceed to a solid-state image pickup device according to a preferred embodiment of this invention. The illustrated solid-state image pickup device is called a CCD solid-state image pickup device of all pixels readout type.

In FIG. 10, the device comprises a solid-state image pickup section 10, a timing pulse generating section 20, the sample-hold circuit 30, the signal processing section 40, the frame memory 50, and a memory controller 52.

The solid-state image pickup section 10 is similar in structure to the solid-state image pickup section 10' in FIG. 2 except that the solid-state image pickup section 10 further comprises an electronic shutter similar to the variable speed electronic shutter as illustrated in FIG. 7. That is, the solid-state image pickup section 10 comprises not only the photoelectric converting sections 11 (FIG. 2), the vertical transfer registers 12 (FIG. 2), the horizontal shift register 13 (FIG. 2), the output amplifier 14 (FIG. 2) but also the electronic shutter.

In addition, the solid-state image pickup section 10 is operable in synchronism with a frame rate of, for example, 30 Hz in the progressive scanning fashion in the NTSC system. More particularly, the photoelectric converting sections 11 accumulate, in response to incident light, electric charges during a controllable accumulating time interval in each frame period as signal charges in synchronism with the frame rate. The electronic shutter discards disused charges during a discarding time interval in the frame period from the photoelectric converting sections 11 to the substrate. The discarding time interval is equal to a difference between the frame period and the controllable accumulating time interval. The frame period is, for example, equal to (1/30) sec. in the NTSC system.

The timing pulse generating section 20 is similar in structure to the timing pulse generating section 20' in FIG. 1 except that the driving pulse generator is modified to be different from that described in conjunction with FIG. 1 as will later become clear and the timing pulse generating section 20 further comprises a shutter driver 26. The driving pulse generator is therefore depicted at 22. The timing pulse generating section 20 includes similar circuit portions designated by the same reference numerals as in FIG. 1. That is, the synchronous signal generator 21, the vertical transfer register driver 23, and the horizontal shift register driver 24 are similar to those in FIG. 1, and description thereto is therefore omitted.

Responsive to the synchronous signals from the synchronous signal generator 21, the driving pulse generator 22 generates not only the vertical driving pulses and the horizontal driving pulses but also a shutter driving pulse. The vertical driving pulses and the horizontal driving pulses are supplied to the vertical transfer register driver 23 and the horizontal shift register driver 24, respectively, while the shutter driving pulse is supplied to the shutter driver 26. The shutter driver 26 supplies the shutter driving pulse to the electronic shutter to drive the electronic shutter. At any rate, the timing pulse generating section 20 makes the solid-state image pickup section 10 operate in synchronism with the frame rate in the progressive scanning fashion and serves as a control arrangement for controlling the controllable accumulating time interval.

Supplied with the above-mentioned driving pulses from the timing pulse generating section 20, the solid-state image pickup section 10 produces a picked-up voltage signal. The picked-up voltage signal is supplied to the sample-hold circuit 30. The sample-hold circuit 30 samples and holds the picked-up voltage signal to produce a sampled-and-held signal. The sampled-and-held signal is supplied to the signal processing circuit 40. The signal processing circuit 40 processes the sampled-and-held signal into a processed signal. More specifically, the signal processing circuit 40 comprises a clamping circuit (not shown), a clipping circuit (not shown), a gamma correction circuit (not shown), and an aperture compensating circuit (not shown). The signal processing circuit carries out DC restoration by the clamping circuit, removal of an unnecessary signal by the clipping circuit, gamma correction by the gamma correction circuit, and aperture compensation by the aperture compensating circuit. The processed signal is stored in the frame memory 50 as frame data. Write-in and read-out in the frame memory 50 is controlled by the memory controller 52. The memory controller 52 controls the frame memory 50 so as to carry out 2:1 interlace and frame-to-field rate conversion on the frame data to make the frame memory produce field data having a field rate as an output video signal. That is, the memory controller 52 serves as a rate converting circuit for converting the frame rate into the field rate. A combination of the sample-hold circuit 30, the signal processing circuit 40, the frame memory 50, and the memory controller 52 serves as a converting arrangement for converting the picked-up voltage signal in the progressive scanning fashion into the output video signal in an interlaced scanning fashion. The output video signal is supplied to a television monitor (not shown) having a television rate to display image represented by the output video signal on a screen thereof.

Figure 11:
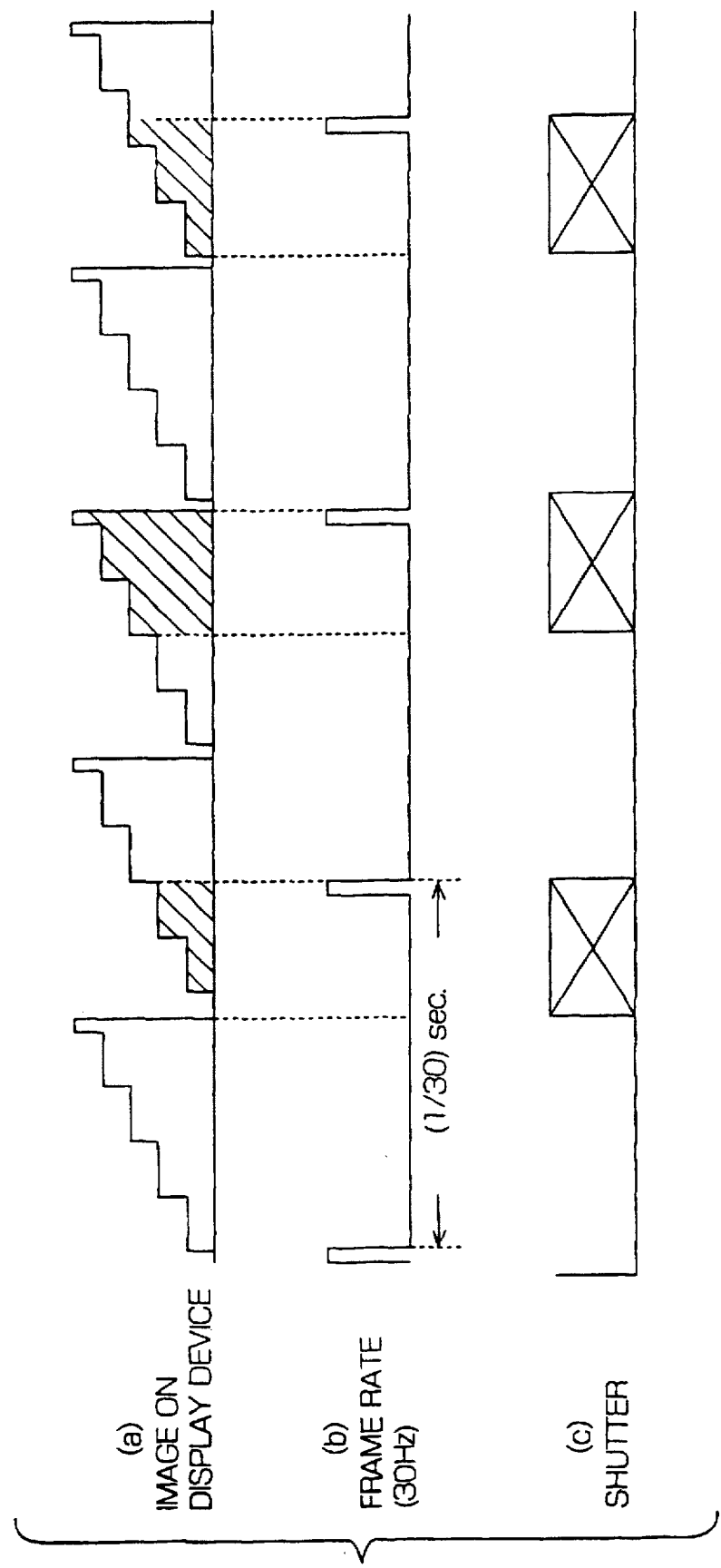
FIGS. 11(a)-(c) collectively show a time chart for use in describing operation in the solid-state image pickup device illustrated in FIG. 10 in a case where a display device has a vertical scanning rate lower than a television rate but higher than a frame rate.

Referring to FIGS. 11(a)-(c) in addition to FIG. 10, description will proceed to operation in the solid-state image pickup device on picking up image on a screen of a display device, for example, in a personal computer to display the output video signal on the screen of the television monitor. In FIGS. 11(a)-(c), FIG. 11(a) shows image on the screen of the display device, FIG. 11(b) shows timings of the frame rate, and FIG. 11(c) shows operation timing of the variable speed electronic shutter. It is assumed that the display device has a vertical scanning rate or a display's scanning frequency which is lower than the television rate of 60 Hz but higher than the frame rate of 30 Hz. In this event, the controllable accumulating time interval can be adjusted with adjusting means (not shown) so that the controllable accumulating time interval matches with a vertical scanning period which is the reciprocal of the vertical scanning rate in the display device. Under the circumstances, the image on the screen of the display device is accumulated in the photoelectric converting sections 11 as the signal charges during the controllable accumulating time interval of the vertical scanning period. Thereafter, disused charges during the discarding time interval, which correspond to a portion of slanting lines in FIG. 11(a), are discarded from the photoelectric converting sections 11 to the substrate by the electronic shutter. As a result, a number of lines the next display field in the display device cannot be sensed.

With this structure, it is possible to display, without generation of the line crawl, the output video signal on the screen of the television monitor that represents the image on the screen of the display device having the vertical scanning rate lower than the television rate of 60 Hz. In addition, it is possible to avoid degradation of resolution in a vertical direction on the screen of the television monitor because of use of the solid-state image pickup device 10 operable in the progressive scanning fashion. Furthermore, it is possible to pick up, without generation of a spurious signal, the image on the display device having the vertical scanning rate which is higher than the frame rate of 30 Hz. This is because the solid-state image pickup device 10 is operable in synchronism with the frame rate of 30 Hz.

What is claimed is:

1. A solid-state image pickup device comprising:
   a solid-state image pickup section comprising:
   a substrate;
   a plurality of photoelectric converting sections formed on the substrate and arranged in a matrix with m rows and n columns, said plurality of photoelectric converting sections for accumulating, in response to incident light, electric charges during a controllable accumulating time interval in each frame period as signal charges synchronized with a frame rate, where m and n represent first and second positive integers each of which is at least two; and
   electronic shutter means, connected to the substrate, for discarding unused charges during a discarding time interval in the frame period from the photoelectric converting sections to the substrate, the discarding time interval being equal to a difference between the frame period and the controllable accumulating time interval; and control means, connected to said solid-state image pickup section, for controlling the controllable accumulating time interval for picking up an image on a screen of a display device having a vertical scanning rate which is higher than the frame rate, the controllable accumulating time interval matching with a vertical scanning period which is the reciprocal of the vertical scanning rate in the display device.

2. A solid-state image pickup device as claimed in claim 1, wherein the frame rate comprises 30 Hz.

3. A solid-state image pickup device as claimed in claim 1, wherein the vertical scanning rate is lower than a field rate of a National Television System Committee (NTSC) system.

4. A solid-state image pickup device as claimed in claim 3, wherein the frame rate comprises 30 Hz while the field rate of the NTSC system comprises 60 Hz.

5. A solid-state image pickup device as claimed in claim 1, wherein said solid-state image pickup section further comprises:

n vertical transfer registers formed on the substrate adjacent to the n columns of the photoelectric converting sections, said n vertical transfer registers for reading the signal charges out of the photoelectric converting sections as read charges and for transferring the read charges along the vertical direction as vertical transferred charges;

a horizontal shift register formed on the substrate connected to each vertical transfer register, said horizontal shift register for serially shifting the vertical transferred charges as horizontal shifted charges; and an output amplifier, connected to said horizontal shift register, for converting the horizontal shifted charges into a picked-up voltage signal.

6. A solid-state image pickup device as claimed in claim 5, wherein said solid-state image pickup section is operable in a progressive scanning fashion, said solid-state image pickup device further comprising converting means for converting the picked-up voltage signal in the progressive scanning fashion into an output video signal in an interlaced scanning fashion.

7. A solid-state image pickup device as claimed in claim 6, wherein said converting means comprises:

a sample-hold circuit, connected to said output amplifier, for sampling and holding the picked-up voltage signal to produce a sampled-and-held signal;

a signal processing circuit, connected to said sample-hold circuit, for processing the sampled-and-held signal into a processed signal;

a frame memory, connected to said signal processing circuit, for storing the processed signal as frame data; and a rate converting circuit, connected to said frame memory, for carrying out 2:1 interlace and frame-to-field rate conversion on the frame data to produce the output video signal.

8. A solid-state image pickup device as claimed in claim 7, wherein the field rate comprises 60 Hz.

9. A method of picking up an image on a screen of a display device by a solid-state image pickup device comprising a solid-state image pickup section, comprising the steps:

accumulating, in response to incident light, electric charges during a controllable accumulating time interval in each frame period as signal charges synchronized with a frame rate;

discarding unused charges during a discarding time interval in the frame period, the discarding time interval being a difference between the frame period and the controllable accumulating time interval;

scanning said display device at a vertical scanning rate higher than the frame rate; and controlling the controllable accumulating time interval so that the controllable accumulating time interval is equal to a vertical scanning period which is the reciprocal of the vertical scanning rate.

10. A method as claimed in claim 9, wherein the frame rate comprises 30 Hz.

11. A method as claimed in claim 9, wherein said solid-state image pickup device is operable in a progressive scanning fashion, wherein said method further comprises the steps of:

reading a picked-up voltage signal in the progressive scanning fashion from the solid-state image pickup section; and converting the picked-up voltage signal into an output video signal in an interlaced scanning fashion.

12. A method as claimed in claim 11, wherein the converting step comprises the steps of:

sampling and holding the picked-up voltage signal to produce a sampled-and-held signal;

processing the sampled-and-held signal into a processed signal;

storing the processed signal in a frame memory as frame data; and carrying out 2:1 interlace and frame-to-field rate conversion on the frame data to produce the output video signal.

13. A method of picking up an image on a screen of a display device by a solid-state image pickup device comprising a solid-state image pickup section including a plurality of photoelectric converting sections, comprising the steps of:

accumulating, in response to incident light, electric charges during a controllable accumulating time interval in each frame period as signal charges synchronized with a frame rate;

discarding unused charges during a discarding time interval in the frame period from the photoelectric converting sections, the discarding time interval being a difference between the frame period and the controllable accumulating time interval;

scanning said display device at a vertical scanning rate higher than the frame rate and lower than a field rate of a National Television System Committee (NTSC) system; and controlling the controllable accumulating time interval so that the controllable accumulating time interval is equal to a vertical scanning period which is the reciprocal of the vertical scanning rate.

14. A method as claimed in claim 13, wherein the frame rate comprises 30 Hz and the field rate of the NTSC system comprises to 60 Hz.

15. A method as claimed in claim 13 wherein said solid-state image pickup device is operable in a progressive scanning fashion, said method further comprising the steps of:

reading a picked-up voltage signal in the progressive scanning fashion from the solid-state image pickup section; and converting the picked-up voltage signal into an output video signal in an interlaced scanning fashion.

16. A method as claimed in claim 15, wherein the converting step comprises the step of:

sampling and holding the picked-up voltage signal to produce a sampled-and-held signal;

processing the sampled-and-held signal into a processed signal;

storing the processed signal in a frame memory as frame data; and carrying out 2:1 interlace and frame-to-field rate conversion on the frame data to produce the output video signal.

* * * * *